(12) United States Patent
Urias et al.

(10) Patent No.: US 11,916,949 B2
(45) Date of Patent: Feb. 27, 2024

(54) INTERNET OF THINGS AND OPERATIONAL TECHNOLOGY DETECTION AND VISUALIZATION PLATFORM

(71) Applicant: National Technology & Engineering Solutions of Sandia, LLC, Albuquerque, NM (US)

(72) Inventors: Vincent Urias, Albuquerque, NM (US); Brian P. Van Leeuwen, Albuquerque, NM (US); Douglas M. Kayatt, Jr., Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 309 days.

(21) Appl. No.: 16/951,904

(22) Filed: Nov. 18, 2020

(65) Prior Publication Data
US 2021/0152590 A1    May 20, 2021

Related U.S. Application Data

(60) Provisional application No. 62/937,494, filed on Nov. 19, 2019.

(51) Int. Cl.
*G16Y 40/50* (2020.01)
*H04L 9/40* (2022.01)
*G06F 9/54* (2006.01)

(52) U.S. Cl.
CPC .......... *H04L 63/1433* (2013.01); *G06F 9/547* (2013.01); *G16Y 40/50* (2020.01); *H04L 63/1425* (2013.01)

(58) Field of Classification Search
CPC . H04L 63/1433; H04L 63/1425; G16Y 40/50; G06F 9/547
USPC .......................................................... 726/25
See application file for complete search history.

(56) References Cited

U.S. PATENT DOCUMENTS

| | | | | |
|---|---|---|---|---|
| 8,176,561 | B1 * | 5/2012 | Hurst ................... | H04L 63/1433 726/1 |
| 9,467,455 | B2 * | 10/2016 | Seiver ................... | H04L 63/101 |
| 9,954,883 | B2 * | 4/2018 | Ahuja ................... | H04L 63/1433 |
| 10,142,204 | B2 * | 11/2018 | Nickolov ............ | H04L 41/0869 |
| 10,171,423 | B1 * | 1/2019 | Woodberg ........... | H04L 63/1408 |
| 10,325,596 | B1 * | 6/2019 | Tran .................... | G10L 15/1822 |
| 10,560,483 | B2 * | 2/2020 | Crabtree ................ | H04L 63/20 |
| 10,735,456 | B2 * | 8/2020 | Crabtree ............. | H04L 63/1441 |

(Continued)

*Primary Examiner* — Thanh T Le
(74) *Attorney, Agent, or Firm* — Gregory M. Doudnikoff; Yee & Associates, P.C.

(57) ABSTRACT

A computer-implemented method of monitoring activity of devices in a network is provided. The method comprises passively collecting data regarding how the devices access the network, and for each device on the network, identifying all other devices on the network with which the device communicates. All communication traffic from the devices to outside the network is identified. A determination is made if there are any required updates and if patches for the devices execute in a fashion defined as safe. A number of risk indicators for privacy risks are determined according to device communication within the network, device communication to outside the network, and update and patch execution. A visualization of any identified risk factors is displayed to a user through a user interface.

33 Claims, 6 Drawing Sheets

(56) References Cited

U.S. PATENT DOCUMENTS

| | | | |
|---|---|---|---|
| 10,812,521 B1* | 10/2020 | Sharifi Mehr | H04L 63/1433 |
| 2009/0190598 A1* | 7/2009 | Christensen | H04L 61/2596 |
| | | | 370/395.53 |
| 2016/0378993 A1* | 12/2016 | McGee | G06F 21/577 |
| | | | 726/25 |
| 2018/0027006 A1* | 1/2018 | Zimmermann | H04L 63/0227 |
| | | | 726/11 |
| 2018/0091558 A1* | 3/2018 | Daugherty | G06F 21/577 |
| 2018/0324204 A1* | 11/2018 | McClory | G06F 9/5027 |
| 2019/0124114 A1* | 4/2019 | Purushothaman | H04L 63/1433 |
| 2019/0199738 A1* | 6/2019 | Jain | H04L 67/2871 |
| 2019/0215339 A1* | 7/2019 | Chen | H04L 63/02 |
| 2019/0222594 A1* | 7/2019 | Davis, III | H04L 41/14 |
| 2020/0374319 A1* | 11/2020 | Yakovlev | H04L 63/1425 |
| 2020/0412757 A1* | 12/2020 | Siddiq | H04L 63/20 |
| 2021/0048796 A1* | 2/2021 | Rieger | G06F 21/82 |
| 2021/0064759 A1* | 3/2021 | Lomonaco | G06F 8/65 |
| 2021/0136032 A1* | 5/2021 | Kim | H04L 63/1425 |
| 2022/0159020 A1* | 5/2022 | Wang | H04L 43/062 |

\* cited by examiner

INTERNET OF THINGS AND OPERATIONAL TECHNOLOGY DETECTION AND VISUALIZATION PLATFORM

CROSS-REFERENCE TO RELATED APPLICATION

This application claims the benefit of U.S. Provisional Application No. 62/937,494 filed Nov. 19, 2019, which is incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to network monitoring, and more specifically to monitoring the activity of devices across a network to assess potential risks to the network.

2. Description of the Related Art

With the rapid growth of smart devices and high-speed networks, the Internet of Things (IoT) has gained wide acceptance and popularities among consumers, representing billions of physical devices around the world that are now connected to the internet. IoT allows real-time communication between physical devices in a network as well as collecting and sharing of data between devices. The devices in IoT can be controlled remotely to perform the desired functionality and serve the purpose of transforming consumers' lives by supplying consumers with intelligent devices to perform daily tasks and chores. IoT can lead to number of intelligent and autonomous applications and services that brings significant benefit. For example, IoT allows users easy access to information in real-time, from almost any location.

Furthermore, automation IoT can reduce operating expenditures when automation devices, sensors, and actuators become Internet-enabled. Operational technology (OT) allows direct monitoring and control of industrial equipment and processes via embedded systems and IoT devices that are interconnected within a converged infrastructure or cloud-based applications. Devices such as building automation, temperature control systems, fabrication facilities, energy production are examples of OT that might be commingled with information technology (IT) assets on a network.

Therefore, it would be desirable to have a method and apparatus that take into account at least some of the issues discussed above, as well as other possible issues.

SUMMARY

An illustrative embodiment provides computer-implemented method of monitoring activity of devices in a network. The method comprises passively collecting data regarding how the devices access the network, and for each device on the network, identifying all other devices on the network with which the device communicates. All communication traffic from the devices to outside the network is identified. A determination is made if there are any required updates and if patches for the devices execute in a fashion defined as safe. A number of risk indicators for privacy risks are determined according to device communication within the network, device communication to outside the network, and update and patch execution. A visualization of any identified risk factors is displayed to a user through a user interface.

Another illustrative embodiment provides a system for monitoring activity of devices in a network. The system comprises a storage device configured to store program instructions, and one or more processor operably connected to the storage device and configured to execute the program instructions to cause the system: to passively collect data regarding how the devices access the network; identify all other devices on the network with which the device communicates for each device on the network; identify all communication traffic from the devices to outside the network; determine if any required updates and patches for the devices execute in a fashion defined as safe; determine a number of risk indicators for privacy risks according to device communication within the network, device communication to outside the network, and update and patch execution; and display a visualization of any identified risk factors to a user through user interface.

Another illustrative embodiment provides a computer program product for monitoring activity of devices in a network. The computer program product comprises a computer-readable storage medium having program instructions embodied thereon to perform the steps of: passively collecting data regarding how the devices access the network; identifying all other devices on the network with which the device communicates for each device on the network; identifying all communication traffic from the devices to outside the network; determining if any required updates and patches for the devices execute in a fashion defined as safe; determining a number of risk indicators for privacy risks according to device communication within the network, device communication to outside the network, and update and patch execution; and displaying a visualization of any identified risk factors to a user through a user interface.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the introduction of IoT into consumer and industrial environments brings risks to network security due to the nature of IoT and the fact that most devices in IoT networks are not primarily designed with security or privacy features in mind. For example, in a home network, IoT devices might use pervasive sensors such as audio and video. IoT companies use outputs from theses sensor back to foreign locations for analysis to improve their products, unknowingly to the user. Additionally, users are now buying and integrating these devices across their homes (e.g., stoves, clocks, refrigerators) and connecting them to their home network without understanding and considering the risk to their privacy and device operation.

The illustrating embodiments also recognize and take into account that a single compromised device is sometimes able to provide unauthorized access to other interconnected devices in the network, and users are typically unaware who these devices are communicating with and if they are operating in a safe and secure fashion. There are limited tools to sense, detect, enumerate, identify, and visualize these networks in any way.

The illustrative embodiments also recognize and take into account that it can be difficult to identify all of the IoT or OT devices on an enterprise network. IoT and OT devices often do not respond as expected to active scans or do not have network stacks the will respond to traditional scanners.

The illustrative embodiments provide a method using passive sensing to collect information and analytics from the universal resource locators (URLs), media access control (MAC) addresses, custom protocol dissection, certificate analysis, domain queries, and other metrics to identify how IoT devices are accessing the network, outside parties with which the devices are communicating, how much data traffic is being moved outside the network, and heuristics to determine if updates and patches are happening in a safe fashion. From this data, the illustrative embodiments generate a series of indicators to inform network administrators of possible privacy risks. The illustrative embodiments provide a user interface (UI) for the user to understand what IoT devices are connected on their network and visualize risk scores for each of them.

Figure 1:
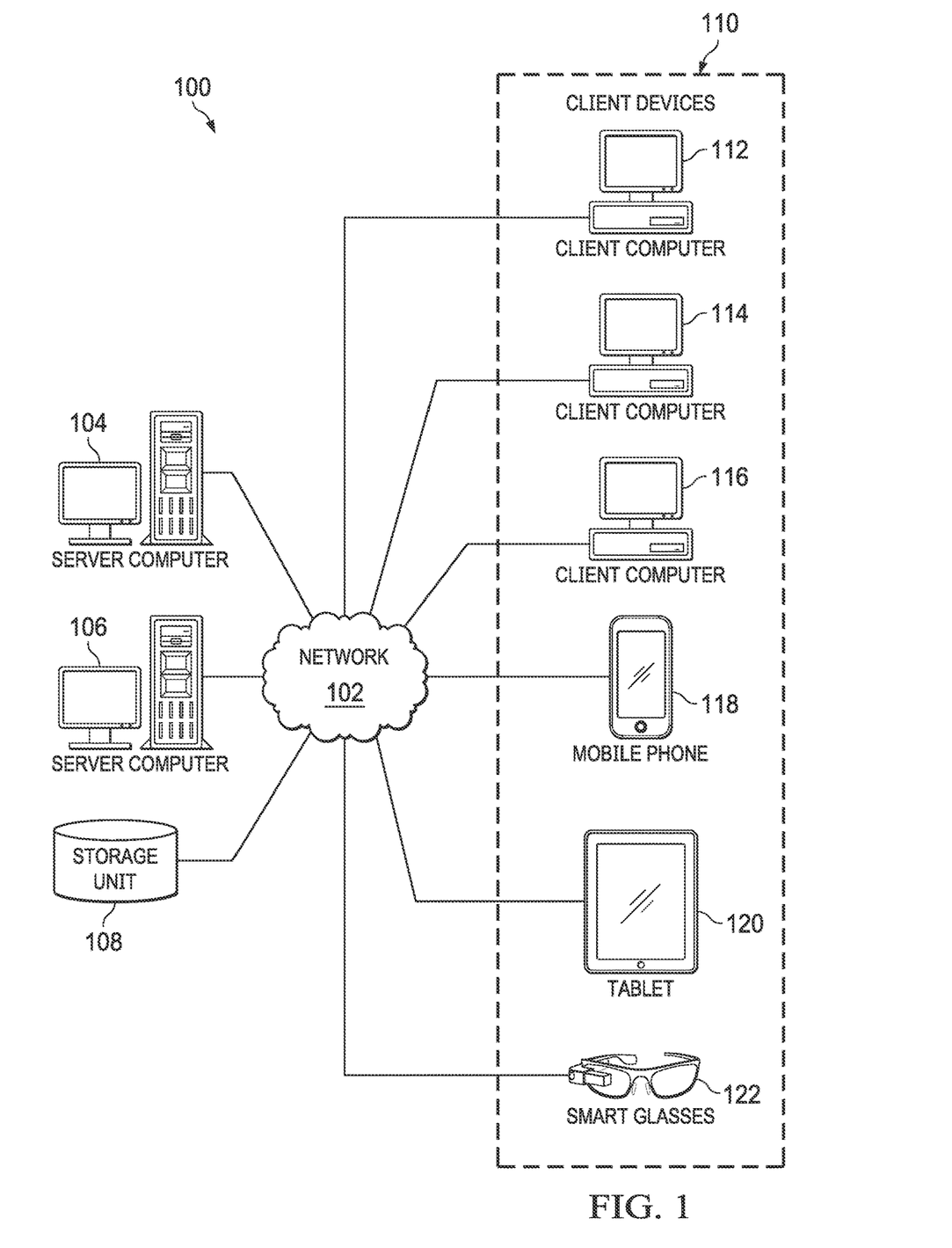
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart devices 122. Smart devices 122 might include any kind of IoT devices, e.g., smart glass (shown), camera, smart devices, smart appliance, or any kind of OT type devices, e.g., remote terminal unit (RTU), intelligent electronic device (IED), or sensors.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), an OT network, or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
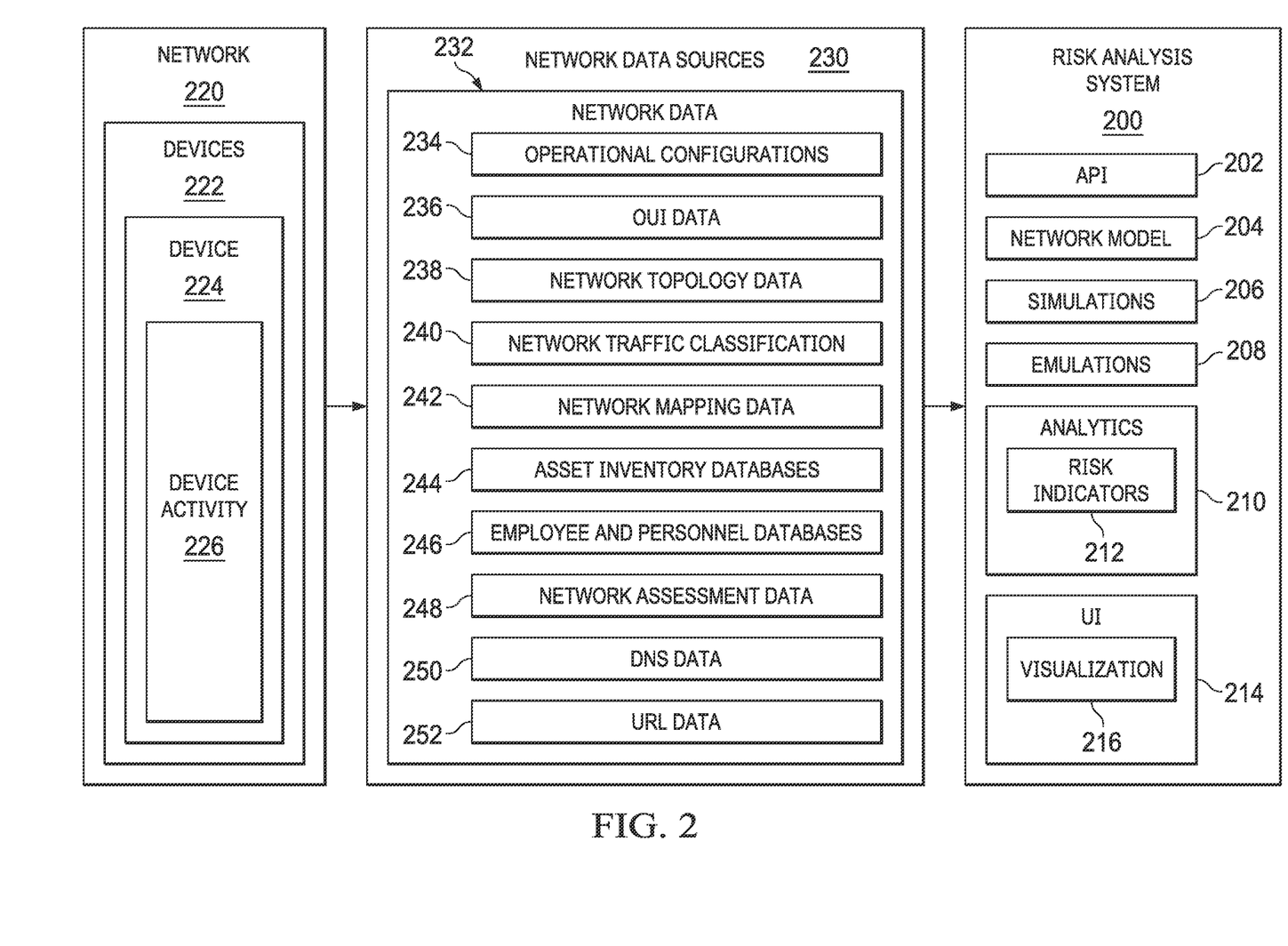
FIG. 2 depicts a block diagram of a software assessment system in accordance with illustrative embodiments.

FIG. 2 depicts a block diagram of a risk analysis system in accordance with illustrative embodiments. Risk analysis system 200 can be implement using one or more server and client computer systems in FIG. 1. Risk analysis system 200 provides a capability to collect data from disparate sources (e.g., Deep Packet Inspection Data (DPI), network analysis data, routing tables, configurations, user inventory, organization information, etc.) and assess potential risks to a network 220.

Network 220 might comprise a number of devices 222. Each device 224 among devices 222 has associated device activity 226, which might comprise communication with other devices 222 within network 220 as well as communication with devices and third parties (not shown) outside network 220.

Risk analysis system 200 enables users to quickly access and correlate data describing near-real time network architecture and device configuration. The results might describe, e.g., device inventory, network topology, device description (i.e. MAC and IP address, manufacturer, operating system details, etc.), system subnetworking, full inventory of connected end-point IP addresses and MAC addresses, situational awareness, and configuration details. Risk analysis system 200 can correlate device-level and system-level configuration data audits and associate them with devices for system audit analysis. Since risk analysis system 200 can obtain device configuration information in near-real time it can enable configuration changes between two periods of time.

A number of network data sources 230 collect network data 232 about device activity 226 associated with devices 222 on network 220. Network data 232 might comprise, e.g., operational configurations 234, organizationally unique identifier (OUI) data 236, network topology data 238, network traffic classification 240, network mapping data 242, asset inventory databases 244, employee and personnel databases 246, network assessment data 248, domain name system (DNS) data 250, and URL data 252. Data sources 230 can provide tools that discover network topology and connectivity and determine device specification, configuration data, network device, and end-point device information. Device system information can be produced from parsing device command line interface (CLI) outputs. Data sources 230 can also obtain operational data such as link data rates and create system-level reports.

Examples of various data stores that might house the data sources 230 might include mySQL, MongoDB, and Splunk index. In this illustrative example, different data stores might offer different advantages. For example, data stored in MongoDB might include asset inventory and personnel databases. Since data quantity can be large, and increased frequency of data collection requires increased data storage and access time, MongoDB can limit the frequency of data collection to an extent that is optimal for the data and retrieval requirement. Search time in Splunk, however, reflects the time Splunk takes to perform a query. However, searches might be saved in Splunk and thereby reduce the need to modify data retrievals.

Application Programming Interface (API) 202 in risk analysis system 200 is able to pull data from data sources 230. API 202 might be Data-Source-Agnostic Select (DSAS). API 202 might provide calls and logic to support "enhancement," which enables incorporation of data from DSAS data stores into a displayed model. API 202 might also provide fields and filters for stored queries to distinguish between queries that are well-suited for enhancement and queries that exist only for filtering.

Data can be accessed statically or dynamically. Static data access might comprise loading data on a near-real time basis. Dynamic data access might comprise enhance on the fly.

Risk analysis system 200 can use network data 232 to construct a high-fidelity network model 204 that can be used to run simulations 206 and emulations 208. Network model 204 can be tested for accuracy (e.g., reachability between devices, permitted/denied data flows, etc.). Using simulations 206 and emulations 208, risk analysis system can validate device configurations at the system level to check for incorrect configurations, inefficient combinations, possible policy issues, access control list (ACL) conflicts, etc.

Analytics (analysis engine) 210 generated from simulations 206 and emulations 208 can evaluate system level security compliance to identify risk indicators 212 associated with particular network configurations. Users can engineer configuration changes and test them in simulated and emulated environments.

UI 214 provides visualization 216 of risk indicators 212 identified by analytics 210. UI 214 can provide views of system topology with variable zoom capability to zoom into regions of interest. UI 214 allows the user to select an individual device 224 in network 220 and obtain descriptive information, based on a variable device description template in according to the user's requirements. A user can note a device specification as "enhanced" and data shown on a pull-down menu, allowing interaction with device objects. The user can also use UI 214 to create custom queries for obtaining system parameters and configuration data. The queries might have variable depth and layered conditions (i.e. AND, OR) and be save for future access.

Additionally, the user interface can be used to modify (e.g., extend, reduce) the network system. This modification might be editing device configuration information or adding or reducing the topology. Risk analysis system 200 saves the resulting network specification which can then be imported into a tool for system simulation 206.

Risk analysis system 200 can be implemented in software, hardware, firmware or a combination thereof. When software is used, the operations performed by risk analysis system 200 can be implemented in program code configured to run on hardware, such as a processor unit. When firmware is used, the operations performed by risk analysis system 200 can be implemented in program code and data and stored in persistent memory to run on a processor unit. When hardware is employed, the hardware may include circuits that operate to perform the operations in risk analysis system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein a processor is comprised of hardware circuits such as those on an integrated circuit that respond and process instructions and program code that operate a computer. When a number of processors execute instructions for a process, the number of processors is one or more processors can be on the same computer or on different computers. In other words, the process can be distributed between processors on the same or different computers in computer system. Further, the number of processors can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type or processor.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

Risk analysis system 200 can be applied to a variety of use cases. For example, system 200 can be used to determine what IP addresses are associated with specific unclassified networks and provide specific information about the host device. System 200 might also be used to find devices with specific characteristics, e.g., IP addresses of encryptors, organizationally unique identifiers (OUI) of discovered MAC addresses.

Risk analysis system 200 might be used to obtain a list of all virtual private networks (VPNs) used in an unclassified network. This might comprise obtaining a list of all external networks that can VPN into the unclassified network and determining the policy definition for a VPN. On a per policy basis, system 200 might determine what IP addresses are permitted and what port numbers they use, e.g., IP address X has inbound 80 allowed for from outside SNL. System 200 might also identify which policy in a firewall permitted a specific VPN connectivity.

System 200 might also be used to obtain virtual local area network (VLAN) tags and descriptions from network devices to help understand network reachability and subnetworking based on VLANs.

System 200 might also obtain information about changes on specific devices over time periods and evaluate different configurations.

Risk analysis system 200 can detect duplicate IP addresses and MAC addresses and report such duplication of addresses. If data is currently incomplete, the duplicate address might be incomplete.

System 200 can import network device configuration data for audit. The analysis engine 210 can check the current network model against a list of rules and generate a report with the results. Verification rules generate error, warning, or note messages to report on misconfigurations and other problems. For example, a verification rule displays a warning if a network statement references an invalid interface, or a duplicate IP address, or OSPF area border routers that are not connected to the backbone area. Summary rules provide information about the configuration and operation of the network. For example, a summary rule generates a report on the distinct OS versions deployed in the network.

Risk analysis system 200 provides for network security compliance reporting with compliance templates.

Figure 3:
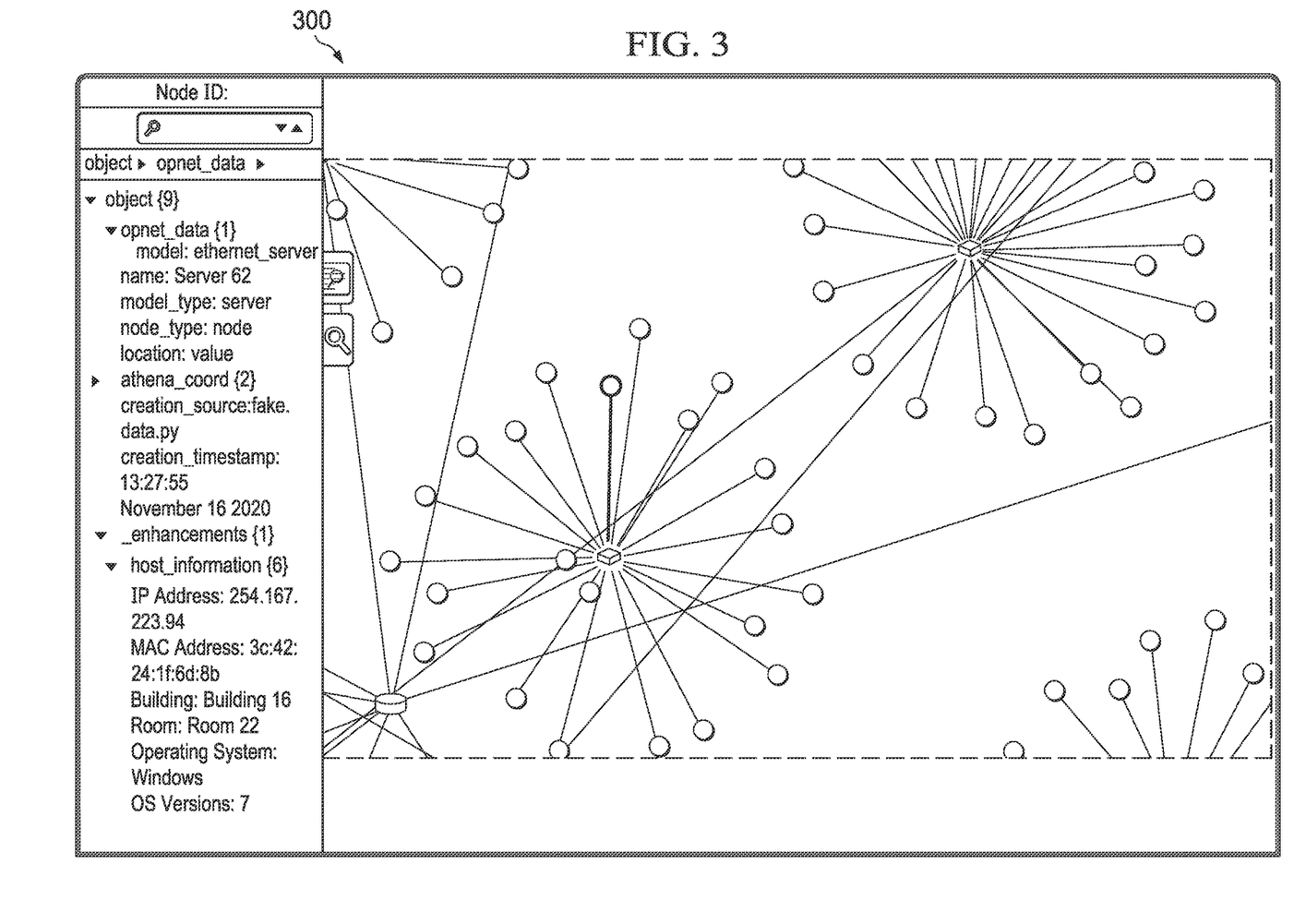
FIG. 3 depicts a user interface for visualizing and tracing an expected path for sessions in a network in accordance with an illustrative embodiment.

FIG. 3 depicts a user interface for visualizing and tracing an expected path for sessions in a network in accordance with an illustrative embodiment. Interface 300 might be an example of UI 214 in FIG. 2.

Figure 4:
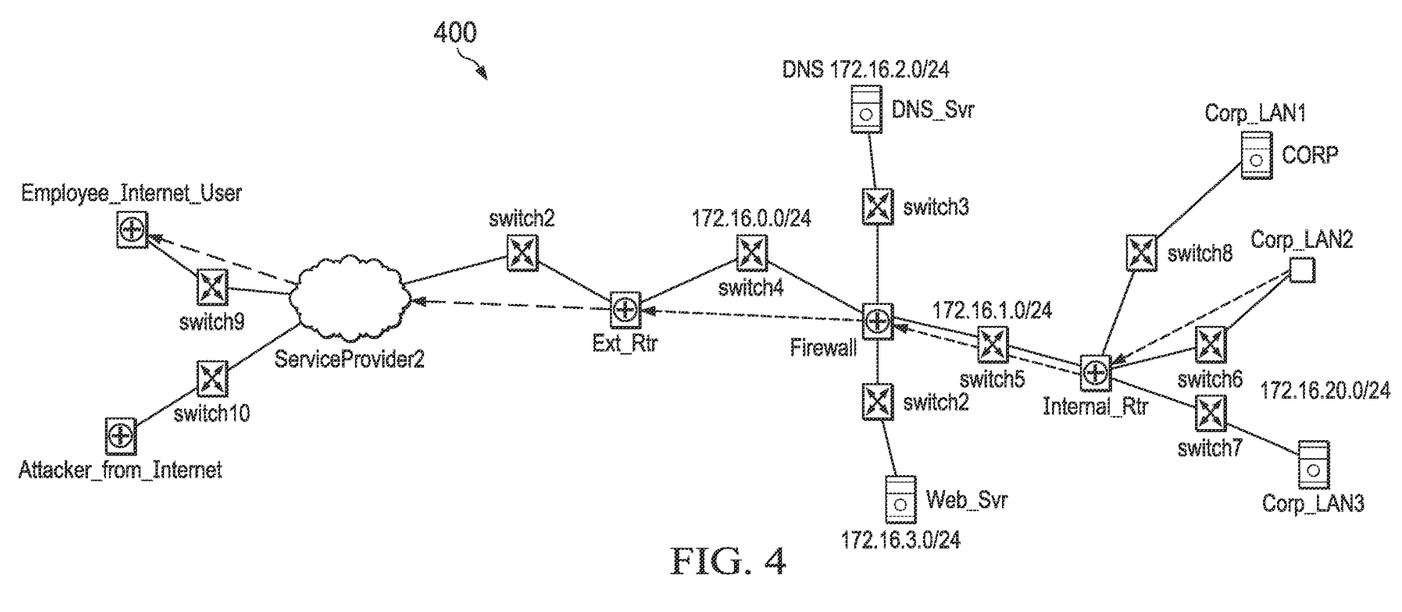
FIG. 4 depicts a user interface for visualizing communication between devices on a network in accordance with an illustrative embodiment.

FIG. 4 depicts a user interface for visualizing communication between devices on a network in accordance with an illustrative embodiment. Interface 400 might be another example of UI 214 in FIG. 2. Interface 400 shows reachability between a set of devices and network device rules and configurations that are invoked in the path between the devices. FIG. 4 depicts a network topology that specifies types of devices or users on a network. Given information regarding device configuration, enterprise architecture, user VLANs, applications, and services, interface 400 can visualize data flows (permitted and denied) and compare routing tables with operation tables.

Figure 5:
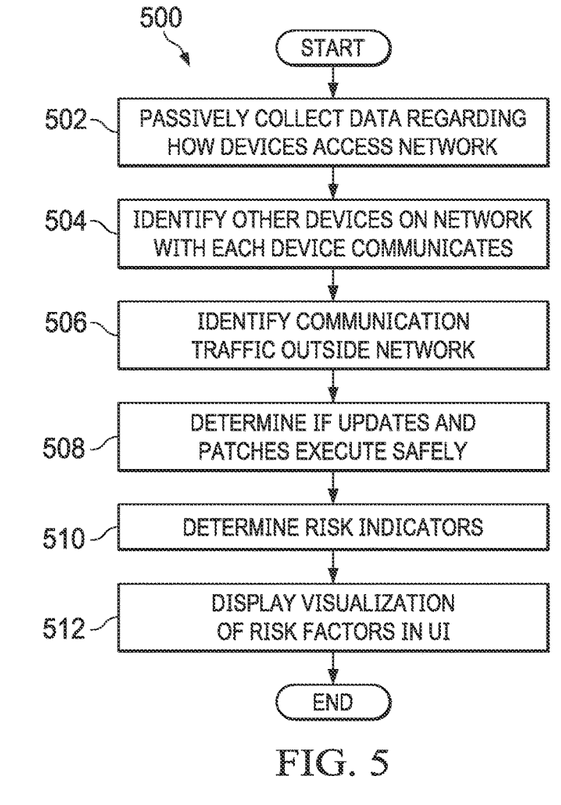
FIG. 5 depicts a flowchart for a process of monitoring activity of devices in a network environment in accordance with an illustrative embodiment.

FIG. 5 depicts a flowchart for a process of monitoring activity of devices in a network environment in accordance with an illustrative embodiment. The process in FIG. 5 can be implemented in hardware, software, or both. When implemented in software, the process can take the form of program code that is run by one of more processor units located in one or more hardware devices in one or more computer systems. Process 500 might be implemented in risk analysis system 200 shown in FIG. 2.

Process 500 begins by passively collecting data regarding how the devices access the network (step 502). Passively collecting data might comprise accessing a number of network data sources and providing an API to gather data from the data source, wherein the API is database agnostic and capable of incorporating data from the data source into a display model. The data stores might comprise at least one of mySQL, MongoDB, or a Splunk Indexer.

Step 502 might comprise analyzing at least one of URL, MAC address, custom protocols, certificates, or domain queries.

For each device on the network, the risk analysis system identifies all other devices on the network with which the device communicates (step 504). The risk analysis system identifies all communication traffic from the devices to outside the network (step 506). The risk analysis system determines if any required updates and patches for the devices execute in a fashion defined as safe (step 508).

The risk analysis system determines a number of risk indicators for privacy risks according to device communication within the network, device communication to outside the network, and update and patch execution (step 510). Determining the risk factors might comprise evaluating each type of communication according to at least one of operational configurations, OUI data, network topology data, network traffic classification, network mapping data, asset inventory databases, employee and personnel databases, network assessment data, DNS data, or URL data. The operational configurations might comprise forward and reverse proxies, firewalls, and router.

Determining the risk indicators might also comprise detection of duplicate IP addresses and MAC address on the network or auditing network device configurations. Auditing the network device configurations might comprise generating error, warning, or note messages to report on misconfiguration and providing information about a configuration and operation of the network.

The risk analysis system displays a visualization of any identified risk factors to a user through a user interface (step 512).

Figure 6:
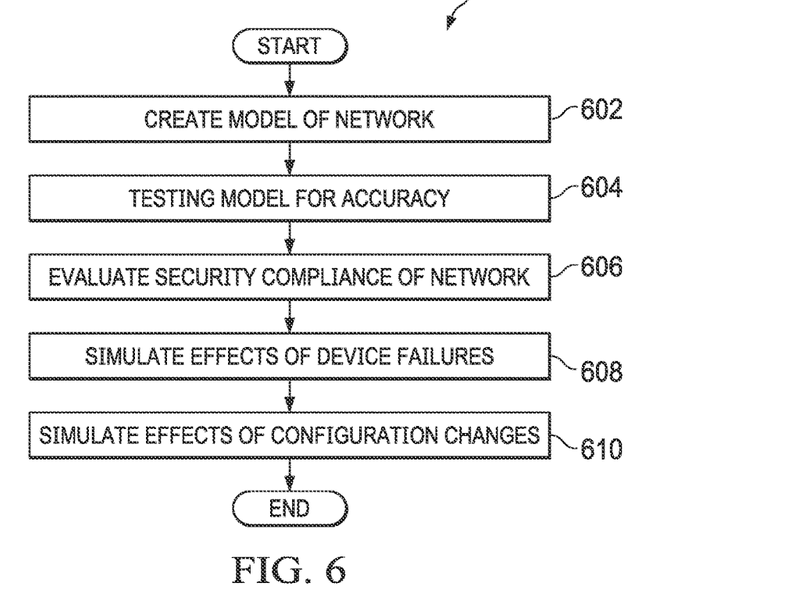
FIG. 6 depicts a flowchart for a process of identifying risk factors in a network environment in accordance with an illustrative embodiment.

FIG. 6 depicts a flowchart for a process of identifying risk factors in a network environment in accordance with an illustrative embodiment. The process in FIG. 6 can be implemented in hardware, software, or both. When implemented in software, the process can take the form of program code that is run by one of more processor units located in one or more hardware devices in one or more computer systems. Process 600 might be an example of a detailed view of step 510 shown in FIG. 5.

Process 600 begins by creating a model of the network (step 602) and testing the model for accuracy (step 604). The model is then used to evaluate system level security compliance of the network (step 606).

Process 600 uses the model to simulate effects on the network of a number of different device failures (step 608). The model is also used to simulate the effects on the network of a number of different configuration changes (step 610). Process 600 then ends.

Figure 7:
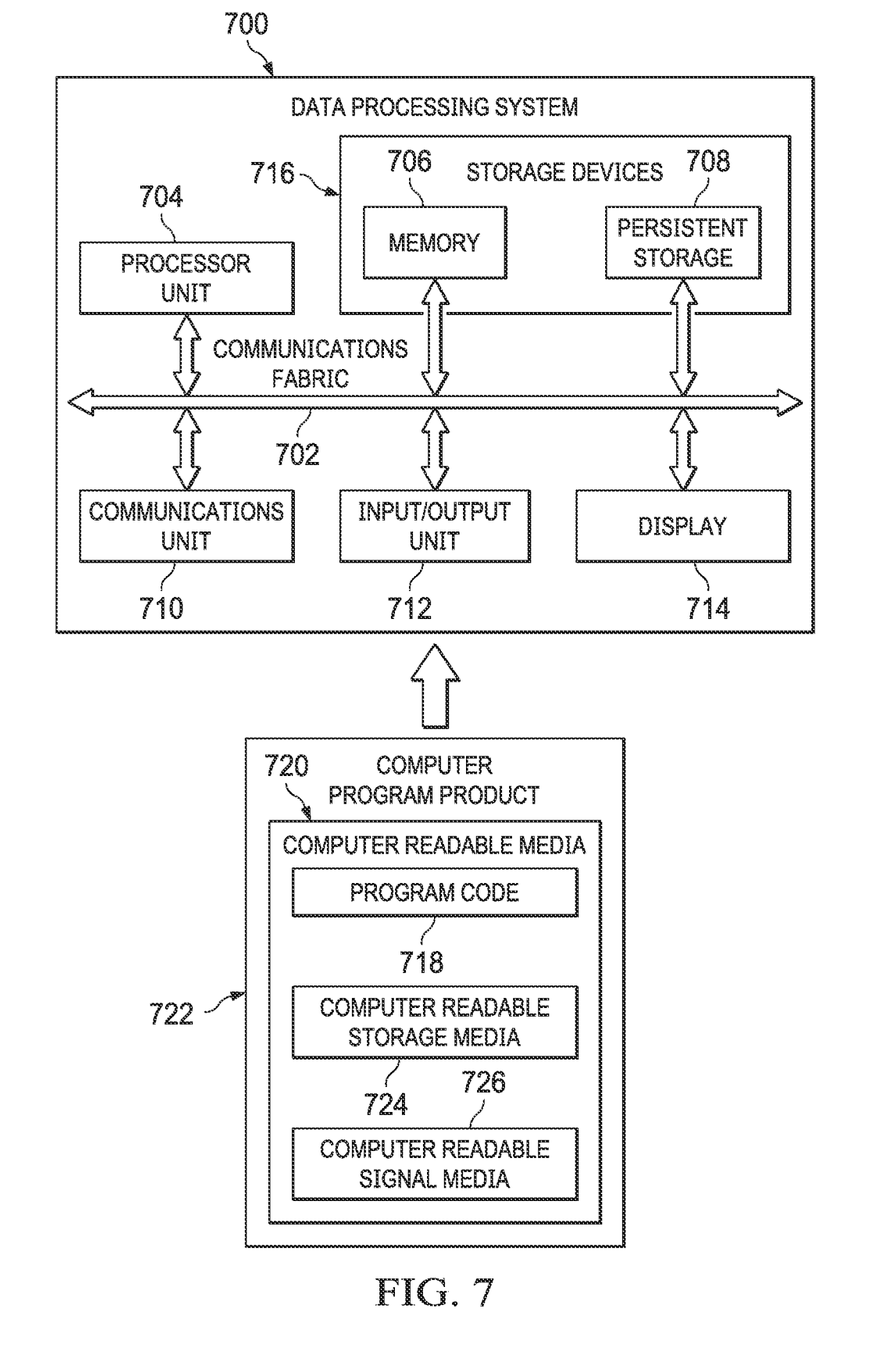
FIG. 7 is a diagram of a data processing system depicted in accordance with an illustrative embodiment.

Turning now to FIG. 7, an illustration of a block diagram of a data processing system is depicted in accordance with an illustrative embodiment. Data processing system 700 may be used to implement one or more computers shown in FIG. 1 (e.g., client devices 110 and servers 104, 106) and data replication system 200 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (GPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of monitoring activity of devices in a network, the method comprising:
   using a number of processors to perform the steps of:
      passively collecting data regarding how the devices access the network;
      for each device on the network, identifying all other devices on the network with which the device communicates;
      identifying all communication traffic from the devices to outside the network;
      determining if there any required updates for the devices;
      determining a number of risk indicators for privacy risks according to device communication within the network, device communication to outside the network, and the required updates for the devices; and
   displaying a visualization of any identified risk factors to a user through a user interface,
   wherein determining the risk indicators comprises:
      creating a model of the network;
      testing the model for accuracy;
      evaluating, with the model, system level security compliance of the network;
      simulating, with the model, effects on the network of a number of different device failures; and
      simulating, with the model, effects on the network of a number of different configuration changes.

2. The method of claim 1, wherein collecting data regarding how the devices access the network comprises analyzing at least one of:
   uniform resource locator;
   media access control address;
   custom protocols;
   certificates; or
   domain queries.

3. The method of claim 1, wherein determining the risk factors according to device communication within the network and device communication to outside the network comprises evaluating each type of communication according to at least one of:
   operational configurations;
   organizationally unique identifier data;
   network topology data;
   network traffic classification;
   network mapping data;
   asset inventory databases;
   employee and personnel databases;
   network assessment data;
   domain name system data; or
   universal resource locator data.

4. The method of claim 3, wherein the operational configurations comprise:
forward and reverse proxies;
firewalls; and
routers.

5. The method of claim 1, wherein the user interface is configured to interact with device objects and modify the network.

6. The method of claim 1, wherein determining the risk indicators comprise detection of duplicate internet protocol addresses and media access control address on the network.

7. The method of claim 1, wherein determining the risk indicators comprises auditing network device configurations.

8. The method of claim 7, wherein auditing the network device configurations comprises:
generating error, warning, or note messages to report on misconfiguration; and
providing information about a configuration and operation of the network.

9. The method of claim 1, wherein passively collecting data regarding how the devices access the network further comprises:
accessing a number of network data sources from a data store; and
providing an application programming interface (API) to gather data from the data source.

10. The method claim 9, wherein the API is database agnostic and capable of incorporating data from the data source into a display model.

11. The method of claim 9, wherein the data store comprises one of:
mySQL;
MongoDB; or
Splunk Indexer.

12. A system for monitoring activity of devices in a network, the system comprising:
a storage device configured to store program instructions; and
one or more processors operably connected to the storage device and configured to execute the program instructions to cause the system to:
passively collect data regarding how the devices access the network;
for each device on the network, identify all other devices on the network with which the device communicates;
identify all communication traffic from the devices to outside the network;
determine if there any required updates for the devices;
determine a number of risk indicators for privacy risks according to device communication within the network, device communication to outside the network, and the required updates for the devices; and
display a visualization of any identified risk factors to a user through a user interface,
wherein determining the risk indicators comprises:
creating a model of the network;
testing the model for accuracy;
evaluating, with the model, system level security compliance of the network;
simulating, with the model, effects on the network of a number of different device failures; and
simulating, with the model, effects on the network of a number of different configuration changes.

13. The system of claim 12, wherein collecting data regarding how the devices access the network comprises analyzing at least one of:
uniform resource locator;
media access control address;
custom protocols;
certificates; or
domain queries.

14. The system of claim 12, wherein determining the risk factors according to device communication within the network and device communication to outside the network comprises evaluating each type of communication according to at least one of:
operational configurations;
organizationally unique identifier data;
network topology data;
network traffic classification;
network mapping data;
asset inventory databases;
employee and personnel databases;
network assessment data;
domain name system data; or
universal resource locator data.

15. The system of claim 14, wherein the operational configurations comprise:
forward and reverse proxies;
firewalls; and
routers.

16. The system of claim 12, wherein the user interface is configured to interact with device objects and modify the network.

17. The system of claim 12, wherein determining the risk indicators comprise detection of duplicate internet protocol addresses and media access control address on the network.

18. The system of claim 12, wherein determining the risk indicators comprises auditing network device configurations.

19. The system of claim 18, wherein auditing the network device configurations comprises:
generating error, warning, or note messages to report on misconfiguration; and
providing information about a configuration and operation of the network.

20. The system of claim 12, wherein passively collecting data regarding how the devices access the network further comprises:
accessing a number of network data sources from a data store; and
providing an application programming interface (API) to gather data from the data source.

21. The system of claim 20, wherein the API is database agnostic and capable of incorporating data from the data source into a display model.

22. The system of claim 20, wherein the data store comprises one of:
mySQL;
MongoDB; or
Splunk Indexer.

23. A computer program product for monitoring activity of devices in a network, the computer program product comprising:
a computer-readable storage medium having program instructions embodied thereon to perform the steps of:
passively collecting data regarding how the devices access the network;

for each device on the network, identifying all other devices on the network with which the device communicates;

identifying all communication traffic from the devices to outside the network;

determining if there any required updates for the devices;

determining a number of risk indicators for privacy risks according to device communication within the network, device communication to outside the network, and the required updates for the devices; and displaying a visualization of any identified risk factors to a user through a user interface, wherein determining the risk indicators comprises:
creating a model of the network;
testing the model for accuracy;
evaluating, with the model, system level security compliance of the network;
simulating, with the model, effects on the network of a number of different device failures; and
simulating, with the model, effects on the network of a number of different configuration changes.

24. The computer program product of claim 23, wherein collecting data regarding how the devices access the network comprises analyzing at least one of:
uniform resource locator;
media access control address;
custom protocols;
certificates; or
domain queries.

25. The computer program product of claim 23, wherein determining the risk factors according to device communication within the network and device communication to outside the network comprises evaluating each type of communication according to at least one of:
operational configurations;
organizationally unique identifier data;
network topology data;
network traffic classification;
network mapping data;
asset inventory databases;
employee and personnel databases;
network assessment data;
domain name system data; or
universal resource locator data.

26. The computer program product of claim 25, wherein the operational configurations comprise:
forward and reverse proxies;
firewalls; and
routers.

27. The computer program product of claim 23, wherein the user interface is configured to interact with device objects and modify the network.

28. The computer program product of claim 23, wherein determining the risk indicators comprise detection of duplicate internet protocol addresses and media access control address on the network.

29. The computer program product of claim 23, wherein determining the risk indicators comprises auditing network device configurations.

30. The computer program product of claim 29, wherein auditing the network device configurations comprises:
generating error, warning, or note messages to report on misconfiguration; and
providing information about a configuration and operation of the network.

31. The computer program product of claim 23, wherein passively collecting data regarding how the devices access the network further comprises:
accessing a number of network data sources from a data store; and
providing an application programming interface (API) to gather data from the data source.

32. The computer program product of claim 31, wherein the API is database agnostic and capable of incorporating data from the data source into a display model.

33. The computer program product of claim 31, wherein the data store comprises one of:
mySQL;
MongoDB; or
Splunk Indexer.

* * * * *